H. Allen,
Stop Cock,
№ 2,351. Patented Nov. 12, 1841.
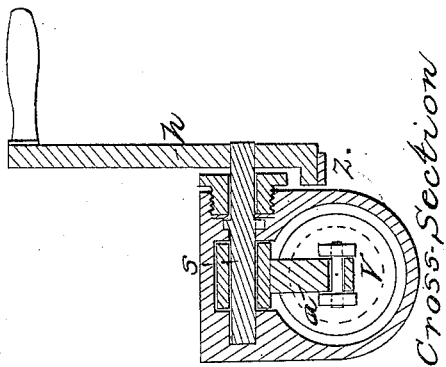
Cross Section
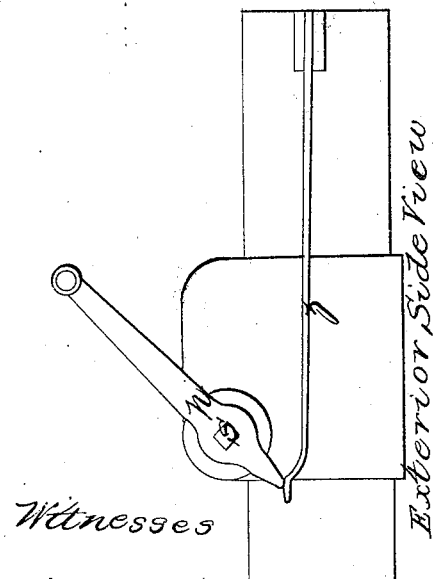
Exterior Side View
Witnesses
Ih. S. Woodward
J. C. Frink
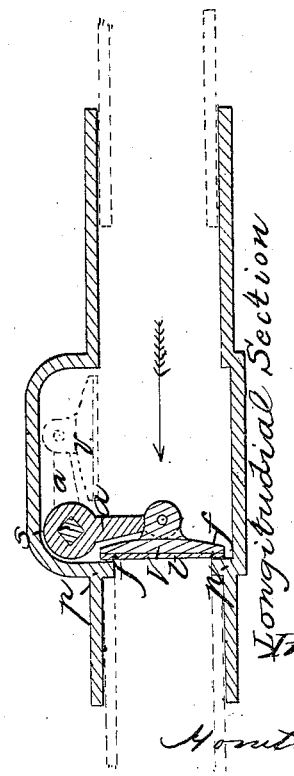
Longitudinal Section
Inventor
Horatio Allen

UNITED STATES PATENT OFFICE.

HORATIO ALLEN, OF NEW YORK, N. Y.

IMPROVEMENT IN THE CONSTRUCTION OF STOP-COCKS.

Specification forming part of Letters Patent No. 2,351, dated November 12, 1841.

*To all whom it may concern:*

Be it known that I, the undersigned, HORATIO ALLEN, of the city, county, and State of New York, have invented a new and useful contrivance called "Allen's Pressure-Closing Stop-Cock," of which the following is a full and exact description.

I propose to form a chamber of dimensions proportionate to the area of passage which the cock is to provide. On the inner surface of this chamber is a projection or shoulder of a depth sufficient to afford an adequate lap to the valve which is to close against it. The side of this projection or shoulder against which the valve is to close is to have a true uniform surface, flat, conical, concave, or convex, as may be preferred. The plate which closes against this prepared surface or seat is to be of form corresponding with the form of the seat and of dimensions to have adequate lap, and may be either ground on or into its seat or covered with leather or other elastic substance. This plate is carried by an arm which is attached to a shaft, which enters the chamber from without, and on the shaft outside the chamber is fastened the handle or other fixture by which the shaft is to be partly turned, and thus an opening or closing motion is given to the valve. The valve is to close with the pressure of the fluid, and consequently the greater the pressure the greater the certainty that the valve will be tight.

To assist the pressure in closing the valve tight when the pressure is very small, I propose to apply a spring outside of the chamber, which, acting on the handle, shall exert any required stress to close the valve, and to relieve the pressure when much in excess I propose to use a similar spring, which, acting on the handle, shall exert any required stress tending to open the valve, the stress being always so much less than the pressure on the valve as will insure a tight valve.

This stop-cock can be used at any point in a line of pipe or at the end of a pipe as a discharge-cock.

The objects supposed to be attained are, first, greater perfection of cock as regards tightness in comparison with ordinary cocks, especially under great pressures; second, greater durability in the tightness after long and continued use, inasmuch as the use of the cock has no tendency to impair its tightness.

The drawing herewith exhibits sections of the combination herein described.

What I claim is—

1. The combination of a suitable seat formed in the inside of a pipe or of a chamber to be placed in the line of pipe, with a plate or valve closing with the pressure against said seat, the plate or valve being carried by an arm attached to a shaft which is worked by a handle outside the chamber.

2. The combination of a spring with the handle outside the chamber, either acting with the pressure of contained fluid to close the valve when the pressure is very light or acting against the pressure of contained fluid when its pressure is very great.

In testimony whereof I, the said HORATIO ALLEN, hereto subscribe my name, in the presence of the witnesses whose names are hereto subscribed, on the 24th day of September, A. D. 1841.

HORATIO ALLEN.

Witnesses:
JNO. S. WOODWARD,
I. C. FRINK.